May 3, 1960 P. DORNIER 2,935,559
APPARATUS FOR INSPECTING MOVING LENGTHS OF FABRIC
Filed Nov. 15, 1957
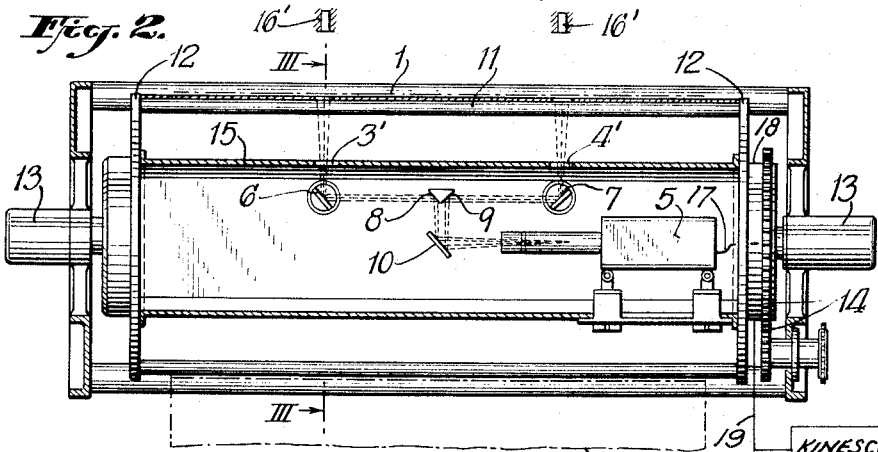
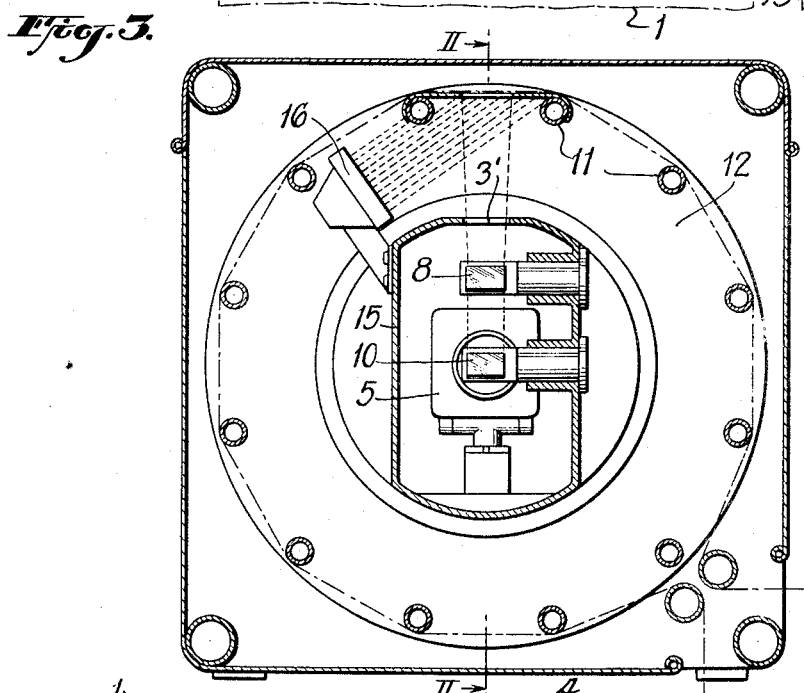
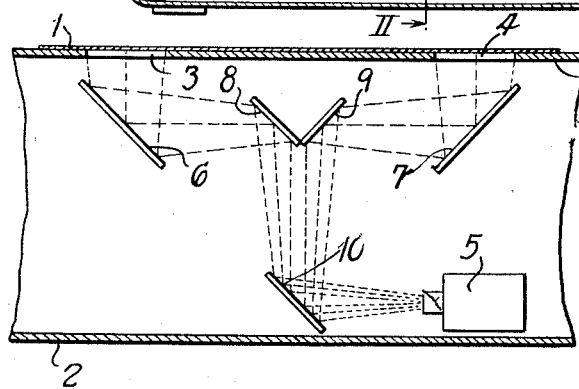
INVENTOR.
PETER DORNIER.
BY K. A. Mayr
ATTORNEY.

United States Patent Office 2,935,559
Patented May 3, 1960

2,935,559

APPARATUS FOR INSPECTING MOVING LENGTHS OF FABRIC

Peter Dornier, Langenargen am Bodensee, Germany, assignor to Lindauer Dornier G.m.b.H., Lindau am Bodensee, Germany, a German firm Application November 15, 1957, Serial No. 696,849

Claims priority, application Germany November 20, 1956

3 Claims. (Cl. 178—6.8)

The present invention relates to an apparatus for inspecting lengths of fabric moving on a rotating drum or cage and is a further development of the device disclosed in my copending application Serial No. 640,164, filed February 14, 1957.

Whereas in the apparatus disclosed in my previous application the image of the fabric to be inspected is directly received by cameras of television apparatus whose principal focus coincides with the inspected portion of the fabric, the device according to the present invention provides optical means such as mirrors, prisms, and the like which are interposed between a camera or another suitable viewing apparatus for indirectly transmitting the image of the inspected portion of the fabric to the camera so that the latter can be placed in any convenient position. The optical means, such as a mirror or a prism may be placed inside the drum or cage which transports the fabric and be independent of the camera or this optical means may be placed forward of the objective of the camera and form a part of the latter.

A plurality of optical means may be provided for diverting the light rays from a plurality of portions of the fabric into the same viewing apparatus or camera. In this case the camera receives images in the form of stripes showing portions of the fabric having the same weft threads. The arrangement of the optical means must be so that the rays of light between the inspected portions of the fabric and the camera have the same length so that the photographic effect of all simultaneously inspected fabric portions is the same.

The apparatus according to the invention is suitable for inspecting fabric or other web material which moves at a speed of 180 to 450 feet per minute as is the case in modern fabric treating devices. Since the human eye can detect skew of the weft strands of woven fabric only if the fabric moves at a speed of less than 120 feet per minute, an apparatus in which the moving fabric is directly viewed by the inspector is useless if the fabric moves faster than 120 feet per minute. In the apparatus according to the invention the fabric to be inspected is laid around a cylindrical element whose circumferential speed is equal to the speed of the moving fabric. An image of a stripe of the fabric which is parallel to the rotation axis of the element can be observed substantially from the moment it runs on the element to substantially the moment when it leaves the element. Although only transverse stripes of the fabric can be observed in this manner which are spaced apart by the circumference of the cylindrical element, the method has been found satisfactory because it does not necessitate slowing down of the fabric causing a considerable loss of time and a corresponding increase of manufacturing cost.

The invention will be understood from the following description when considered in connection with the accompanying drawing forming part thereof and in which:

Fig. 1 is a diagrammatic illustration of an apparatus according to the invention.

Fig. 2 is a longitudinal sectional view of an embodiment of the invention.

Fig. 3 is a cross sectional view on a large scale of the device shown in Fig. 2, the section being taken along line III—III in Fig. 2 and showing a modified arrangement of a light source.

Like parts are designated by like numerals in all figures of the drawing.

Referring more particularly to the drawing, numeral 1 designates the fabric which rests on a rotating substantially cylindrical hollow body 2 and is transported thereby. Numerals 3 and 4 designate apertures or windows in the body 2 through which the fabric 1 can be seen from the interior of the body 2. A camera 5 of a television sending apparatus is placed inside the body 2. Mirrors 6, 8 and 10 direct the light rays from the portion of the fabric 1 which portion is visible through the aperture 3 into the camera 5. Mirrors 7, 9 and 10 direct the light rays from the portion of the fabric 1 which portion is visible through the aperture 4 into the camera 5.

Figs. 2 and 3 illustrate an embodiment of the invention in which the fabric rests on spaced parallel tubes 11 mounted on the circumference of two spaced coaxially positioned discs 12. The structure 11, 12 is supported by bearings 13 and rotated by a toothed gearing 14 whose pinion may be driven by a motor, not shown. A frame 15 is mounted between the discs 12, the frame 15 supporting a camera 5 of a television sending apparatus whose principal axis coincides with the rotation axis of the cage 11, 12. The frame is provided with apertures 3' and 4' through which portions of the fabric which are positioned adjacent to the apertures can be viewed. The rays of light extending from the fabric through the opening 3' are reflected by mirrors 6, 8 and 10 and directed into the camera 5. The light rays extending through the aperture 4' are directed into the camera 5 by means of mirrors 7, 9 and 10. The image received in the camera 5 is transmitted by an electric conduit 17 to a ring 18 and therefrom via a brush and conductor 19 to a conventional image receiver and kinescope.

As shown in Fig. 3 two sources of light 16 are mounted on the frame 15 for individually lighting the portions of the fabric which portions are viewed through the apertures 3' and 4'. Alternatively two light sources 16' may be placed externally of the frame for directing light towards the apertures 3' and 4', as is shown in Fig. 2.

Inasmuch as changes may be made in the form, location and relative arrangement of the several parts of the apparatus disclosed without departing from the essential characteristics of the invention, it will be understood that the invention is not limited except by the scope of the appended claims.

What is claimed is:

1. An apparatus for inspecting fast moving fabric and other web material, comprising a substantially cylindrical means around which the fabric is laid and which rotates at a circumferential speed which is equal to the speed of movement of the fabric, a television camera placed inside said cylindrical means and rotating therewith, at least a portion of the outer surface of said cylindrical means on which the fabric is laid being transparent, optical means placed inside said cylindrical means and rotating therewith for transmitting an image of the fabric lying on said transparent portion to said camera, a stationary kinescope placed outside of said rotating cylindrical means, and electric conduit means interconnecting said camera and said kinescope for transmitting the image received by said camera to said kinescope, whereby transverse portions of the fabric can be viewed during a maximal period of time corresponding substantially to a full revolution of said cylindrical means.

2. An apparatus as defined in claim 1 in which said optical means include at least two spaced image receiving means.

3. An apparatus according to claim 1 in which the principal axis of said camera coincides with the rotation axis of said substantially cylindrical means.

References Cited in the file of this patent

UNITED STATES PATENTS

| 2,355,465 | Oberkirk | Aug. 8, 1944 |
| 2,561,197 | Goldsmith | July 17, 1951 |

FOREIGN PATENTS

| 614,317 | Great Britain | Dec. 14, 1948 |